United States Patent [19]

Morgan et al.

[11] Patent Number: 4,961,444
[45] Date of Patent: Oct. 9, 1990

[54] CLAMP ASSEMBLIES

[75] Inventors: Ian H. Morgan, Torwood; Sean McAvoy, Burnside View, both of Scotland

[73] Assignee: Cooper Industries, Inc., Houston, Tex.

[21] Appl. No.: 382,609

[22] Filed: Jul. 19, 1989

[30] Foreign Application Priority Data

Jul. 21, 1988 [GB] United Kingdom ................ 8817358

[51] Int. Cl.$^5$ ....................... F16K 43/00; F16K 51/00
[52] U.S. Cl. .................................. 137/315; 137/454.2;
248/231.6; 248/316.6; 403/12; 403/344
[58] Field of Search ........ 137/226.1, 315, 318, 454.2,
137/454.6; 248/74.4, 231.6, 316.6; 285/23, 367,
410, 420; 403/12, 344; 251/326, 327, 328, 329,
635, 636

[56] References Cited

U.S. PATENT DOCUMENTS

| 784,979 | 3/1905 | Bruce | 248/74.4 |
|---|---|---|---|
| 3,220,245 | 11/1965 | Van Winkle | 285/367 |
| 3,656,501 | 4/1972 | Buchta | 137/315 |
| 3,675,893 | 7/1972 | Avelines | 137/315 |
| 3,799,191 | 3/1974 | Burkhardt et al. | 137/454.2 |
| 3,918,478 | 11/1975 | LeRonax | 137/315 |
| 4,258,941 | 3/1981 | Sands | 137/318 |
| 4,311,297 | 1/1982 | Barrington | 137/236.1 |
| 4,437,486 | 3/1984 | Bianchi | 137/315 |
| 4,471,799 | 9/1984 | Buck | 137/454.2 |
| 4,606,368 | 8/1986 | McCafferty | 137/454.2 |
| 4,633,897 | 1/1987 | Effenberger | 137/315 |
| 4,638,834 | 1/1987 | Montgomery | 137/315 |
| 4,725,080 | 2/1988 | Josefiak et al. | 285/367 |
| 4,727,901 | 3/1988 | Horvei | 137/315 |
| 4,901,752 | 2/1990 | Horvei | 137/315 |

Primary Examiner—George L. Walton
Attorney, Agent, or Firm—David A. Rose

[57] ABSTRACT

The invention relates to clamping assemblies for use, for example, in clamping abutting end portions of, say, pipeline members. The assemblies are particularly useful in the clamping of insert valves in oil pipelines. The assembly comprises two clamping elements (36) adapted to encircle the pipeline members (2,4) in abutting relationship, support means (50) to support the elements (36) in a spaced-apart condition, said support means (50) comprising a mounting member adapted to be secured to one of the members to be clamped, at a location spaced from the abutable surface thereof, said mounting member (50) including a plurality of guide rods (52) projecting therefrom. Each clamping element (36) is slidably mounted upon respective guide rods for movement between the spaced-apart condition and a clamped condition and the guide rods (52) are provided with outer end portions including engaging portions adapted to engage firmly with respect to the clamping elements (36) when in their spaced apart condition, inner portions of the rods being narrower so as to be adapted to allow limited adjusting movement of the elements as they move towards the clamped condition.

8 Claims, 4 Drawing Sheets

CLAMP ASSEMBLIES

The invention is concerned with clamp assemblies, particularly, but not exclusively for exerting a clamping action on abutting end portions of two members for example, pipeline component end portions.

In an example of the use of an assembly according to the invention, it may be required to mount an insert valve in a seating member in a pipeline. The pipeline may be provided with a valve receiving body in which the seating member is arranged. An insert valve arrangement of this type is described in our co-pending U.K. Application No. 8907842.2. In such an arrangement, the seating member is provided with an annular abutment flange against which is to be clamped a co-operating annular abutment flange mounted on the body of the insert valve, while the sealing surfaces co-operate as described in the above mentioned application.

Where the insert valve is to be positioned or repositioned after checking or replacement in situ, difficulties may be encountered in operating a clamping assembly manually or indeed by remote control operation because of the location of the pipe, for example a sub-sea pipe.

Difficulties are thus caused firstly by the need to locate the members of the clamping assembly in an accurate manner while the members are held in an open condition, so that on moving the members towards the closed condition the members correctly wrap about the abutting flanges. However, secondly, clamping members held rigidly with respect to one another while apart do not permit the required tolerances to take account of adjustments necessary to correct minor deviations from an accurate path of the closing movement.

An object of the present invention is to mitigate the above problems.

The invention therefore provides in one of its several aspects, a clamping assembly for use in maintaining in abutment two members having confronting, abutable surfaces, said assembly comprising an annular clamping means comprising two clamping elements adapted to encircle the members in abutting relationship, support means to support said elements in a spaced-apart condition, said support means comprising a mounting member adapted to be secured to one of the members to be clamped, at a location spaced from the abutable surface thereof, said mounting member including a plurality of guide means projecting therefrom, wherein each said clamping element is slidably mounted upon respective guide means for movement between said spaced-apart condition and a clamped condition and wherein said guide means are provided with outer end portions including engaging portions adapted to engage firmly with respect to the clamping elements when in their spaced apart condition, said guide means being further provided with inner portions adapted to allow limited adjusting movement of the elements as they move towards the clamped condition.

Advantageously, the clamping elements may be generally C-shaped in form having end portions thereof provided with bores for the passage of adjustable elongate stud members.

Conveniently, said stud members may be operated manually to cause the elements to move with respect to said guide members between said spaced-apart and clamped conditions, or preferably the studs may be engageable by a ratchet torquing tool, which may be remote-controlled.

Advantageously, the members to be maintained in abutment comprise an insert valve provided with a seal comprising a front sealing face adapted to seal against a co-operating sealing face of the second of the members comprising a receiver for the insert valve. The insert valve may have an angled rear sealing face adapted to seal against a co-operating angled surface in a groove formed in a sealing face of the insert valve, the angled sealing face of the insert valve and the co-operating surface of the groove being a slight angular mismatch whereby on initial contact therebetween, only a portion of said rear sealing face of the insert valve engages said co-operating angled surface of the groove, thus not hindering in any way the full insertion of the valve in the receiver.

The invention provides, in another of its several aspects, a valve assembly comprising a valve receiving member arranged in a pipeline so as to permit the insertion of a valve body therein to provide communication between said body and the bore of the pipeline, a longitudinal axis of the valve body lying perpendicular to the bore centre line, wherein the valve body is provided with an at least partly frusto-conical nose portion adapted to be received within a complementarily contoured hollow chamber of the valve receiving member, each of said valve body and said valve receiving member being provided with sealing surfaces adapted to be rendered fluid tight in contact by the provision of clamping means as described above and adapted to clamp one of said abutable surfaces provided on said valve body against a second confronting abutable surface provided on said valve receiving member.

There will now be described an example of the valve assembly and clamping assembly according to the invention. It will be understood that the description, which is to be read with reference to the drawings, is given by way of example only and not by way of limitation.

Figure 1:
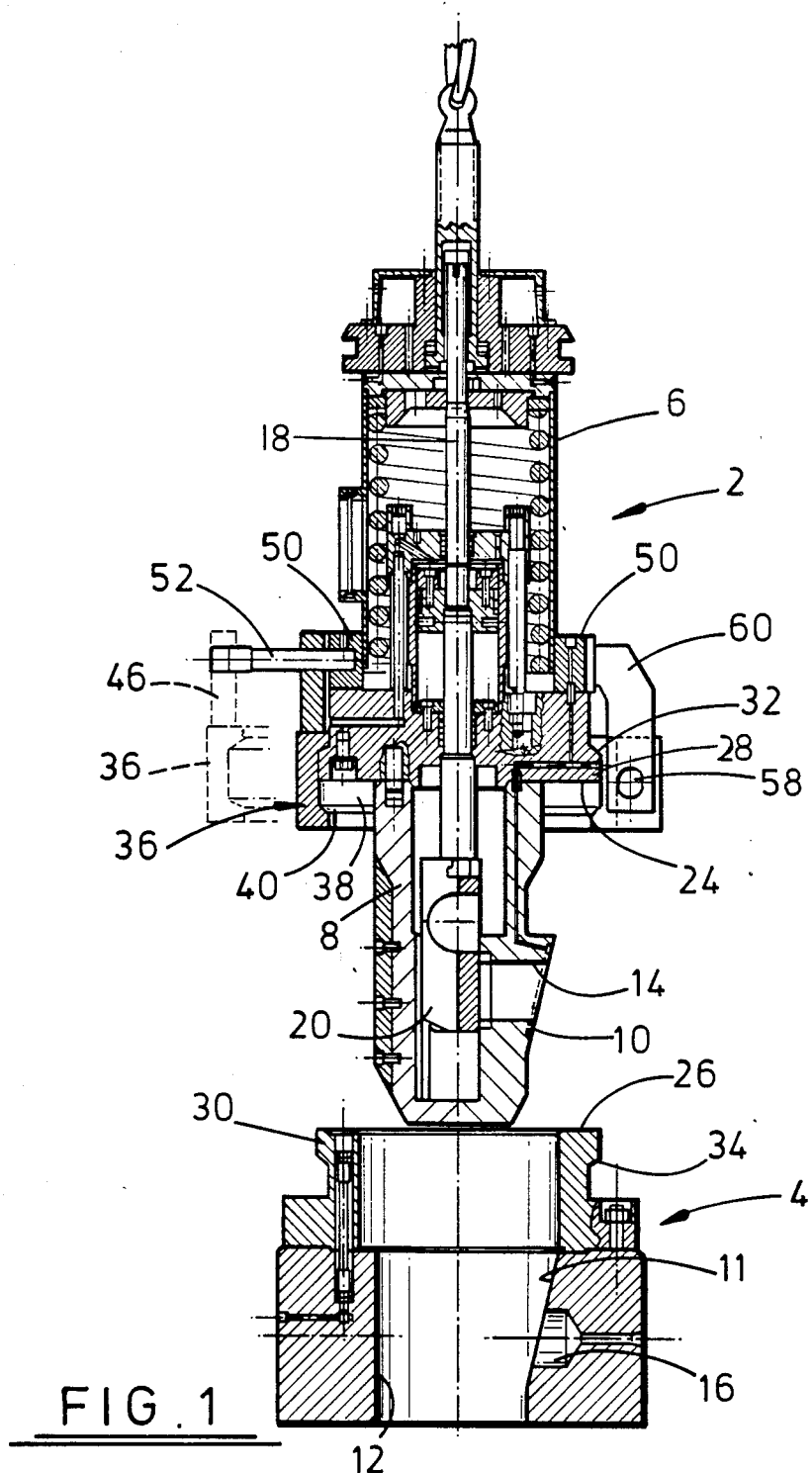
FIG. 1 shows a sectional view through a valve assembly and a clamping assembly, taken on two planes at right angles to each other and passing through the centre line of the assembly.
Figure 2:
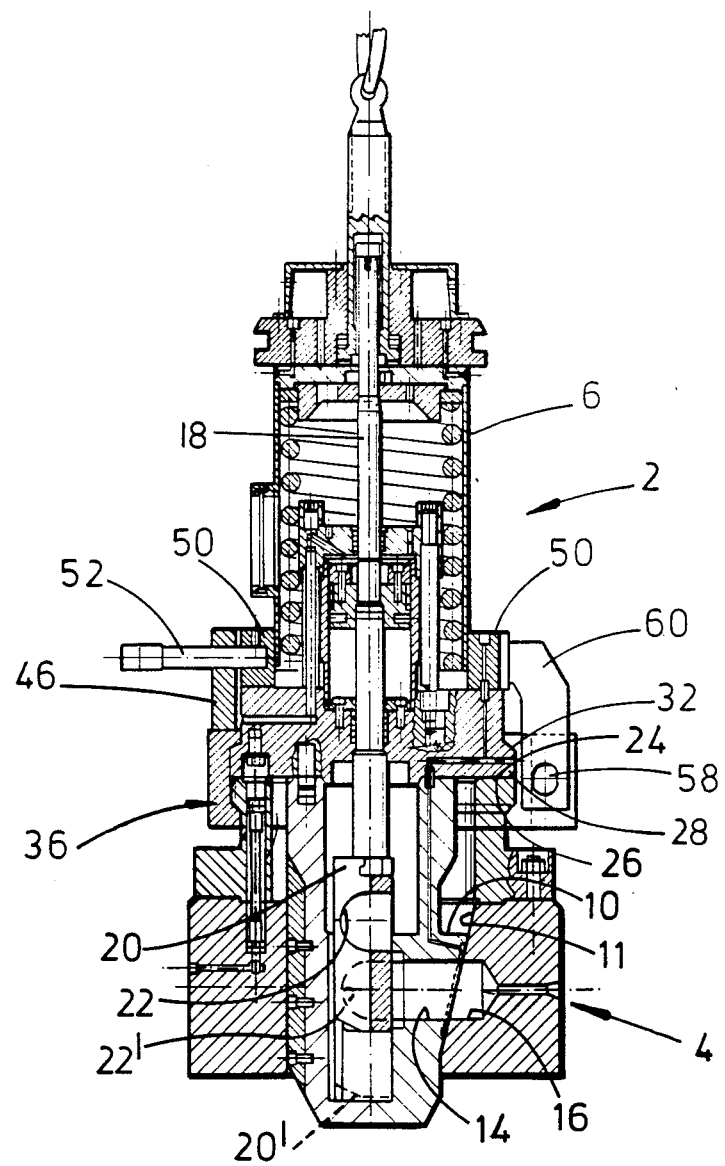
FIG. 2 shows the assemblies of FIG. 1 in an operating condition.

FIG. 1 shows an insert valve indicated at 2 for insertion in a valve receiving body 4, of a sub-sea pipeline. The valve comprises a housing 6 having a nose portion 8 including a projecting, semi-conical portion 10 adapted to be received in a groove 11 of a hollow chamber 12 of the body 4. A passage 14 in the nose portion 8 gives communication in use with a bore 16 of the valve body 4, as may be more clearly seen in FIG. 2. The valve operation is remote-controlled and comprises the lengthwise movement of a valve stem 18 to move a head portion 20 between the full line position shown in FIG. 2, in which the bore 16 is blanked off by the head portion 20, and a dotted line position 20= in which a passage 22 in the head 20 is in communication with the bore 16 at 22=.

Fluid-tight sealing is required between the insert valve 2 and the receiving body 4 to prevent leakage. The complementary configuration of the nose portion 10 and the chamber 12 is such that the more firmly the nose portion is pressed into the recess forming the chamber 12, the tighter are the sealing surfaces of the portion 10 and the groove 11 pressed together.

It is arranged that the oblique angle of the portion 10 is a slight mismatch with the angle of inclination of the groove 11. Thus any initial contact between the two parts is only a line contact and does not in any way resist the continued insertion of the valve 2 into the valve receiving body 4.

There will therefore now be described a clamping assembly capable of providing the necessary permanent pressure. The clamping assembly to be described operates to bring together confronting surfaces 24 and 26 of the insert valve 2 and the receiving body 4 respectively. These surfaces 24 and 26 are provided respectively on flanged portions 28 and 30 of the valve 2 which also have exterior tapered surfaces 32 and 34, respectively.

Figure 3:
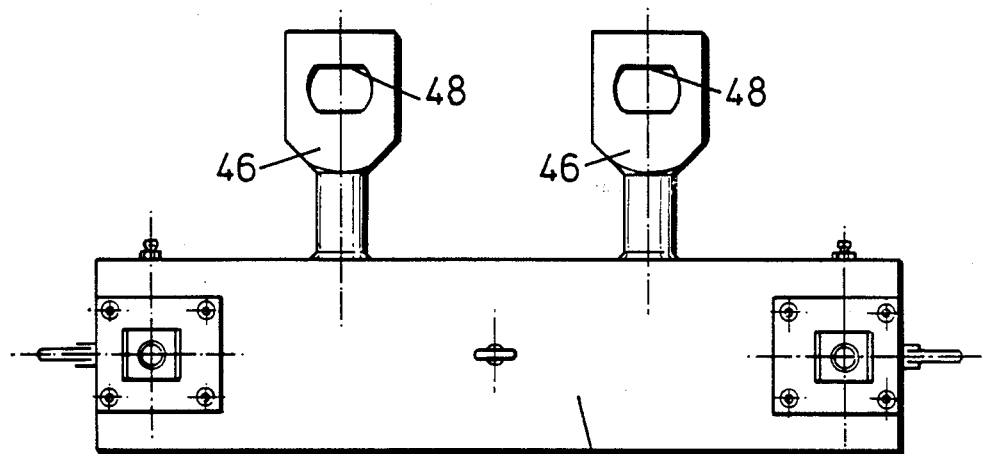
FIG. 3 shows a side view of a clamping element.
Figure 4:
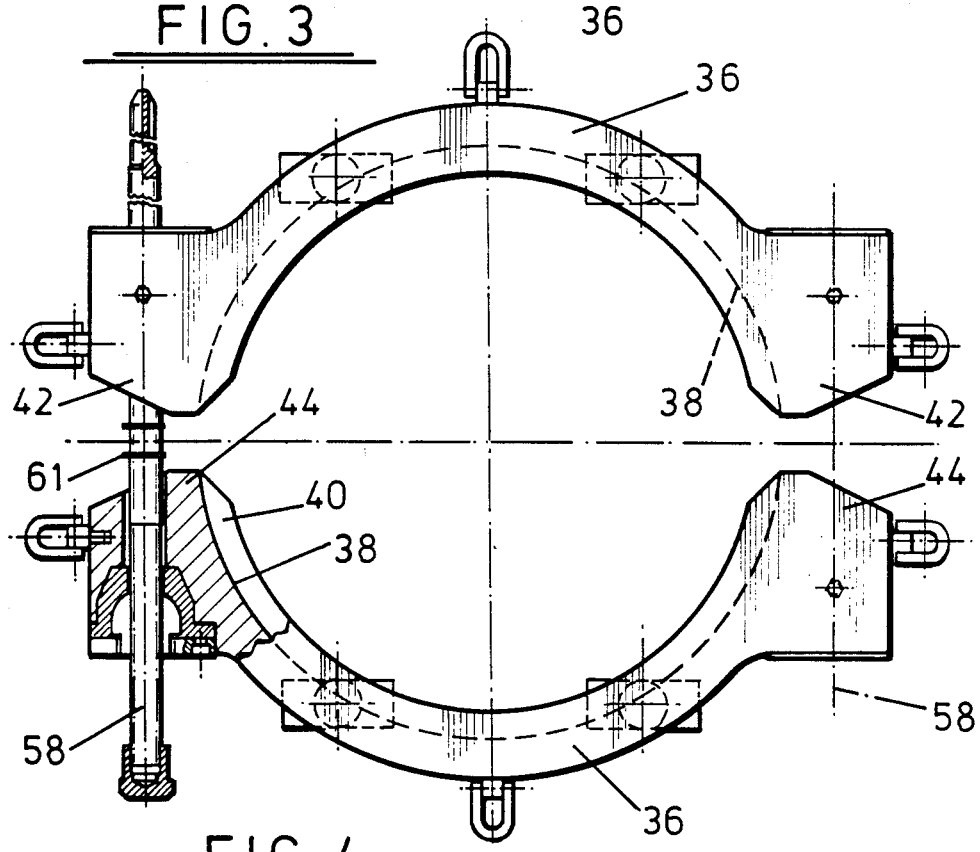
FIG. 4 shows two clamping elements of FIG. 3 in plan.

An annular clamping means comprising two generally C-shaped clamping elements 36 are shown in FIGS. 3 and 4, each element having an interior wall surface 38 contoured to provide tapering portions 40 which, when end portions 42, 44 of the elements are forced towards each other, engage the surfaces 32 and 34 to press together the flange portions 28 and 30 and thus force the nose portion 8 into the chamber 12 with sufficient pressure to ensure a fluid-tight seal.

Each clamping element 36 is provided with two upstanding lugs 46 having elongate slots 48 formed therein for purposes to be explained hereinafter.

Figure 5:
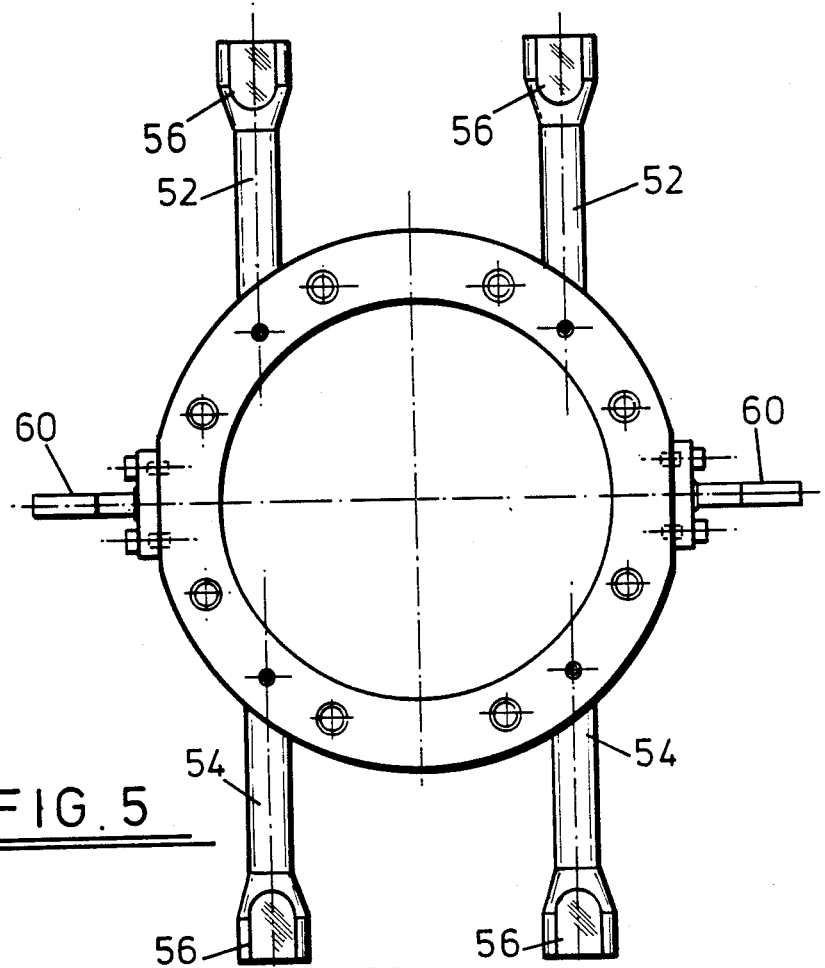
FIG. 5 shows a carrier ring of the clamping assembly.
Figure 6:
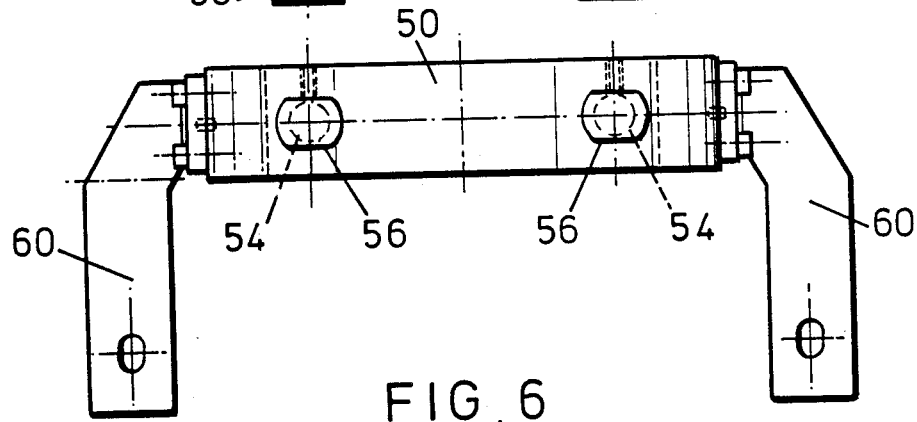
FIG. 6 is an side view of the carrier ring of FIG. 5.

Mounted upon the housing 6 of the valve insert 2 so as to encircle the latter is a carrier ring 50, see FIGS. 5 and 6. Extending from the ring 50 are two pairs of guide means in the form of two rods 52 extending in a parallel manner in one direction and two rods 54 similarly extending in the opposite direction.

Each of the four rods 52,54 is provided with an enlarged head portion 56 having an elongated cross-section as seen in an end view of FIG. 6, which corresponds to the dimensions of the slots 48 of the clamp element lugs 46 so that when the clamping elements 36 are in a open, spaced-apart position, (shown at 36⌐ in broken lines in FIG. 1) the elements are held firmly with respect to the rods 52,54 and the carrier ring 50.

Each end portion 42,44 of the clamping elements 36 is provided with a bore provided by an internally threaded insert. Confronting end portions 42,44 are thus connected together by one of two elongate adjustable studs 58 (only one shown in FIG. 4). The studs 58 are provided with two oppositely handed screw threaded regions along their length and are engageable by a hydraulic ratchet tool applying torque to rotate the studs simultaneously thus controlling the distance between the elements 36. Each stud is supported at its central portion by means of a bracket 60 which is received between retaining flanges 61 on each stud so as to ensure the stud is maintained in a central position, the bracket 60 being fixed to the carrier ring 50. In the spaced-apart condition therefore the assembly of ring 50, rods 52,54, lugs 46, clamping elements 36 and stud 58 is rigid and therefore may be moved bodily with the valve insert 2 for accurate positioning with respect to the receiving body 4.

Once the insert 2 has been placed in position for sealing, the studs 58 are rotated and the clamping elements commence to move towards each other. The lugs 46 therefore begin to move inwardly along the rods 52,54. In doing so, the enlarged head portions 56 become free of the slots 48 and the lugs 46 are then supported on the main portion of the rods which is of reduced diameter relative to the enlarged head portions. Thus there is a degree of play provided in the hitherto rigidly held assembly The elements 36 when they contact the abutting flange portions 28,30 are permitted to adjust slightly as required to centre on the surfaces 32,34 of the flange portions to ensure that the elements 36 wrap accurately around the flange portions 28,30, thus pressing the surfaces 24,26 firmly together, to ensure a proper seal in the pipe union as explained above.

In the example, provision is made for preventing accidental dismantling of the clamping elements by provided stop means (not shown) on the studs 58 and preventing over-stressing thereof.

Various modifications may be made within the scope of the invention as defined by the following claims.

We claim:

1. A clamping assembly for use in maintaining in abutment two annular members having confronting, abutable surfaces, said assembly comprising:

two clamping elements adapted to encircle the annular members in abutting relationship, a mounting member adapted to be secured to one of the annular members to be clamped, at a location spaced from the abutable surface thereof, said mounting member including a plurality of guide means projecting therefrom, each said clamping element being suspendedly and slidably mounted upon respective guide means so as to be parallel and opposed to each other four parallel inward and outward movement along said guide means between said spaced-apart condition and a clamped condition and said guide means being provided with outer end portions having first dimensions and said clamping elements having cooperable means for cooperatively engaging said outer end portions to suspend the clamping elements in a rigid manner when in their spaced apart condition, said guide means being further provided with inner portions having second dimensions for cooperative engagement with said cooperable means to allow limited adjusting movement of the clamping elements as they move towards the clamped condition.

2. An assembly as claimed in claim 1, wherein the clamping elements are C-shaped in form and are provided with end portions having bores therethrough, there being further provided adjustable elongate stud members each adapted to pass through one said bore of both clamping elements and carrier members engageable with said guide means.

3. An assembly as claimed in claim 1, wherein a pair of stud members are operable through each of the ends of said clamping elements to cause the elements to move with respect to the guide means between said spaced apart and clamped conditions.

4. A clamping assembly for use in maintaining in abutment two members having confronting, abutable surfaces, said assembly comprising an annular clamping means comprising two clamping elements adapted to encircle the members in abutting relationship, support means to support said elements in a spaced-apart condition, said support means comprising a mounting member adapted to be secured to one of the members to be clamped, at a location spaced from the abutable surface thereof, said mounting member including a plurality of guide means projecting therefrom, wherein each of said clamping element is slidably mounted upon respective guide means for movement between said spaced-apart condition and a clamped condition and wherein said guide means are provided with outer end portions including engaging portions adapted to engage firmly with respect to the clamping elements when in their spaced apart condition, said guide means being further provided with inner portions adapted to allow limited adjusting movement of the elements as they move towards the clamped condition, wherein said guide means further comprises a carrier mounted on one of said members, a plurality of guide rods extending from said carrier in a parallel manner in two opposed directions away from the carrier, and engagement means mounted on the clamping elements, said engagement means having apertures for sliding engagement on one clamping element with the guide rods extending in a first of said two directions and of the other clamping element with the guide rods extending in a second of said two directions, the guide rods having inner and outer end portions relative to the carrier, said outer end portions being provided with a first dimensioned cross-sectional area and said inner portions being provided with second smaller cross-sectional area dimensions whereby said outer end portions are tightly received by said apertures to suspend said clamping elements in a firm and rigid manner and said inner end portions are loosely received by said apertures to allow adjustment of said clamping elements with respect to said members for alignment.

5. An assembly as claimed in claim 4, wherein the clamping elements are provided with lug portions having bores therethrough, said bores corresponding in size with the cross-sectional area and dimensions of the outer end portions of said rods of the guide means.

6. A valve assembly comprising:
a valve receiving member arranged in a pipeline so as to permit the insertion of an insert valve member therein to provide communication between said insert valve member and the bore of the pipeline,
a longitudinal axis of the insert valve member lying perpendicular to the center line of the pipeline bore, wherein the insert valve member is provided with an at least partly frustoconical nose portion adapted to be received within a complimentarily contoured hollow chamber of the valve receiving member,
each of said insert valve member and said valve receiving member having annular flanges with abutable surfaces and being provided with sealing surfaces adapted to be rendered fluid tight in contact by the provision of an annular clamping means comprising two clamping elements adapted to encircle the annular flanges in abutting relationship,
a mounting member adapted to be secured to one of the valve members to be clamped, at a location spaced from the abutable surface of said annular flanges,
said mounting member including a plurality of elongate guide means projecting therefrom, said guide means extending in two opposed directions in a plane parallel to the plane of the confronting, abutable surfaces of said annular flanges, wherein each said clamping element is suspendedly and slidably mounted upon respective guide means for inward and outward movement along said guide means between said spaced-apart condition and a clamped condition and
said guide means being provided with outer end portions having first dimensions and said clamping elements having cooperable means for cooperatively engaging said outer end portions to suspend the clamping elements in a rigid manner when in their spaced-apart condition, said guide means being further provided with inner portions having second dimensions for cooperative engagement with said cooperable means to allow limited vertical adjusting movement of the clamping elements as they move towards the clamped condition,
the arrangement being such that the clamping assembly is adapted to clamp one of said abutable surfaces provided on said valve body against a second confronting abutable surface provided on said valve receiving member whereby said insert valve member may be removed from said valve receiving member for maintenance purposes.

7. A valve assembly as claimed in claim 6, wherein said nose portion comprises a projecting semi-conical portion and the hollow chamber of the valve receiving member comprises a complimentarily contoured groove, there being provided in said nose portion a fluid passageway, a further passageway being provided so as to open in the groove, said passageway communicating in a fluid tight manner when the clamping assembly is operative.

8. A valve assembly as claimed in claim 6, wherein the angle of inclination of the projecting semi-conical portion and the angle of inclination of the groove differ by a small amount so as to provide a mismatch.

* * * * *

UNITED STATES PATENT AND TRADEMARK OFFICE
CERTIFICATE OF CORRECTION

PATENT NO. : 4,961,444

DATED : October 9, 1990

INVENTOR(S) : Ian Hendry Morgan and Sean McAvoy

It is certified that error appears in the above—identified patent and that said Letters Patent is hereby corrected as shown below:

COLUMN 4;
 In Claim 1, Line 34; delete "four"; insert --for--.

Signed and Sealed this

Thirty-first Day of March, 1992

*Attest:*

HARRY F. MANBECK, JR.

*Attesting Officer*      *Commissioner of Patents and Trademarks*